United States Patent [19]

Sekiguchi et al.

[11] Patent Number: 4,628,187
[45] Date of Patent: Dec. 9, 1986

[54] PLANAR RESISTANCE HEATING ELEMENT

[75] Inventors: Tsugio Sekiguchi, Machida; Noboru Sato, Hachioji; Hiroki Igarashi, Hatano; Akiyoshi Ozawa, Zama; Iemi Nakazawa, Sagamihara, all of Japan

[73] Assignee: Tokyo Cosmos Electric Co., Ltd., Tokyo, Japan

[21] Appl. No.: 699,535

[22] Filed: Feb. 8, 1985

[30] Foreign Application Priority Data

Mar. 2, 1984 [JP] Japan ............................. 59-31049[U]

[51] Int. Cl.⁴ ............................................... H05B 1/02
[52] U.S. Cl. .................................... 219/505; 219/541; 219/543; 219/548; 338/328; 338/306; 338/308; 338/309
[58] Field of Search .............. 219/345, 505, 528, 541, 219/543, 544, 549, 553, 548; 338/22 R, 22 SD, 211, 212, 214, 309, 314, 328, 306–308; 428/214; 252/511

[56] References Cited

U.S. PATENT DOCUMENTS 3,757,088  9/1973  Osborn ................................. 219/553
3,781,526 12/1973  Domron ............................... 219/538
3,878,362  4/1975  Stinger ................................ 219/528
3,900,654  9/1975  Stinger .............................. 219/553 X
4,016,525  4/1977  Maher et al. ........................ 338/309
4,250,398  2/1981  Ellis et al. ........................... 219/345
4,304,987 12/1981  VanKonynenburg .............. 219/553
4,485,297 11/1984  Grise et al. .......................... 219/528

Primary Examiner—H. Broome
Assistant Examiner—M. M. Lateef
Attorney, Agent, or Firm—Pollock, Vande Sande and Priddy

[57] ABSTRACT

A planar resistance heating element with positive temperature coefficient characteristics includes a resistive body layer formed of a crystalline resin containing electrically conductive particles and disposed between at least a pair of electrodes on an insulating substrate. A phenolic resin layer or a denatured phenolic resin layer with an elastomer resin added is disposed on the resistive body layer in covering relation to the entire surface thereof. An insulating protective film of resin may be disposed on the covering layer with an adhesive layer interposed therebetween, and an adhesive layer may be disposed on an outer surface of the insulating protective film for attachment to an object to be heated.

14 Claims, 8 Drawing Figures

PLANAR RESISTANCE HEATING ELEMENT

BACKGROUND OF THE INVENTION

The present invention relates to a planar resistance heating element composed of a resistive body having a stable positive temperature coefficient in a high-temperature range.

There are known electrically conductive polymers made of certain polymer materials having minute electrically conductive particles e.g. carbon, dispersed therein which exhibit a positive temperature coefficient (hereinafter referred to as a "PTC"). A conductive polymer with such a PTC is capable of limiting a current flowing therethrough, and hence is utilized as a temperature sensor or a heating element having an ability to control the temperature thereof.

As disclosed in U.S. Pat. Nos. 3,591,526 and 3,673,121, for example, a resistive body comprising a conductive polymer of the type described above is formed by mixing conductive particles such as of carbon black or graphite with a crystalline resin such as polyethylene or polypropylene, heating and kneading the mixture, and molding the mixture to a desired shape, or reducing the mixture to powder or fine pellets, mixing the powder or fine pellets with a molding resin, and molding the mixture to a desired configuration, thereby producing a resistance heating element.

The resistive body has a PTC characteristic since the crystalline resin changes from a crystalline structure to an amorphous structure to result in a sharp rise in resistance in the vicinity of a melting point thereof. The resistance of the crystalline resin becomes maximum in the vicinity of the melting point, but is abruptly reduced when the resistive body reaches a temperature beyond the melting point. If the temperature of the resistive body exceeds a certain value, it loses its ability to limit the current and the temperature thereof rises to the point where the resistive body will suffer from burning. The same problem occurs with a planar resistance heating element comprising a resistive body of a PTC patterned on a substrate as by screen printing. FIG. 2 of the accompanying drawings shows a temperature-resistance characteristic curve B indicating that when an ambient temperature T, given on a horizontal axis, is in excess of 110° C., a resistance ratio $R_T/R_{20}$ is reduced, the resistance ratio being a ratio between a resistance $R_{20}$ at a temperature of 20° C. and a resistance $R_T$ at a certain temperature T.

Since the resistance of the resistive body is reduced at temperatures higher than the melting point of the crystalline resin, the resistive body has an insufficient ability to withstand heat with respect to the temperature. For example, if the resistive body is used in a resistance heating body with self temperature control, when the crystalline resin is heated to a temperature higher than the melting point for some reason, an excessive current flows throughout the resistive body which then may suffer burning. FIG. 3 shows a characteristic curve B of the conventional planar resistance heating element, described above, in an accelerated deterioration test in which a voltage of 500 V that is 5 times greater than the rated voltage is applied to the resistance heating element. The graph of FIG. 3 has a horizontal axis indicating the time (hour) during which the voltage is continuously applied and a vertical axis representative of a current (A). Study of the curve B clearly indicates that after the voltage has been applied for about 20 minutes, an excessive current flows and the resistive body is burned out.

Where the resistive body described above is employed as a resistance heating body with self temperature control, the resistive body will be soften in the vicinity of the controlled temperature and deformed if a slight external force is imposed on the body. It is also known that in the resistive body, the conductive particles generally have poor affinity with the crystalline resin, and the condition in which the conductive particles are dispersed in the crystalline resin is subjected to changes. Therefore, the resistance of the resistive body is unstable, and the PTC characteristics will be lost in a relatively short period of time.

SUMMARY OF THE INVENTION

With the prior difficulties of the resistive body in view, it is an object of the present invention to provide a planar resistance heating element having a self temperature control capability with PTC characteristics that are maintained even when the planar resistance heating element is heated to a temperature range in excess of the melting point of the crystalline resin.

Another object of the present invention is to provide a planar resistance heating element having the above improved PTC characteristics and increased flexibility.

Still another object of the present invention is to provide a planar resistance heating element having the above improved PTC characteristics and suitable for use as a heater element in a defroster and mirror combination.

According to the present invention, at least a pair of electrodes are disposed on a substrate, and a resistive body layer of a crystalline resin containing electrically conductive particles is disposed between the electrodes. A phenolic resin layer is disposed on the resistive body layer fully over the surface thereof. With the above arrangement, there is provided a planar resistance heating element having a resistance which will not be reduced when the temperature of the planar resistance heating element exceeds the melting point of the crystalline resin, the planar resistance heating element having stable PTC characteristics in a high temperature range.

According to another embodiment of the invention, the surface of the resistive body layer may be covered with a layer of a phenolic resin denatured by an elastomer resin, rather than the phenolic resin layer. The planar resistance heating element thus constructed has better flexibility. An adhesive layer, an insulating sheet such as of polyester, another adhesive layer, and a release paper sheet may be disposed as a laminate on the phenolic resin layer or the denatured phenolic resin layer. In use, the outer release paper sheet is peeled off to allow the planar resistance heating element to be applied easily to the back of a mirror, for example.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
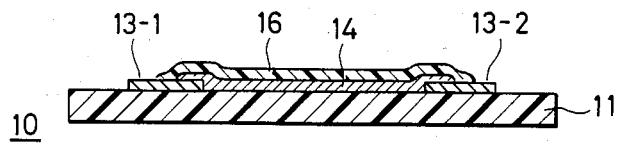
FIG. 1 is a cross-sectional view showing a basic arrangement of a planar resistance heating element according to the present invention.

FIG. 1 shows in cross section a basic arrangement of a planar resistance heating element according to the present invention. A pair of electrode patterns 13-1, 13-2 of an electrode paste are coated, as by screen printing, on an insulating substrate 11 of a polyester resin having a thickness in the range of from 100 $\mu$m to 0.8 mm, for example. The coated electrode patterns 13-1, 13-2 are then baked into electrodes 13-1, 13-2. The electrode paste used comprises a mixture of silver powder, phenol, and a solvent, which mixture is kneaded into a paste.

A resistance paste is coated by screen printing in a rectangular pattern between the electrodes 13-1, 13-2, and then baked at a prescribed temperature for a prescribed time to form a resistive body layer 14. According to an example, the resistive body layer 14 of a thickness in a range of 8 to 15 $\mu$m was formed by baking the resistance paste at 160° C. for 20 minutes or at 170° C. for 10 minutes. According to experiments, if the thickness of the resistance body layer 14 was greater than the aforementioned range, the resistance recovering characteristics from a high temperature degraded and it was difficult to completely evaporate by baking the solvent, resulting in an unstable resistance characteristic. On the other hand, if the thickness is smaller than the aforementioned range, it was difficult to achieve a suitably low resistance value as a PTC heater.

Among various crystalline resins, the copolymer of polyethylene and vinyl acetate has been found to provide a melting point which is controllable in a wide range by selecting quantity and molecular weight of the vinyl acetate polymer to be used, thus facilitating easy design of a resistance heating element having a desired PTC. The resistance paste comprised a mixture of 55 parts by weight of a copolymer of polyethylene and vinyl acetate, 45 parts by weight of graphite, 30 parts by weight of a fire retardant, 20 parts by weight of a filler, and a solvent, the mixture being kneaded into a paste. The copolymer of polyethylene and vinyl acetate used as a crystalline resin had a melting point of 100° C. The filler used was fine particles of an inorganic insulating material as of alumina or silica.

A phenolic resin layer 16 is deposited on the entire surface of the resistive body layer 14 by coating a phenol resin paste on the resistive body layer 14 through screen printing and baking the coated paste at 160° C. for 20 minutes, for example. The thickness of the phenolic resin layer 16 was selected to be in the range 5 to 20 $\mu$m in an example. Phenolic resin layers of thicknesses greater than 20 $\mu$m were likely to form cracks in the layers when bent because of decreased flexibility and were poor in long term stability because of the solvent left in the layer. On the other hand, phenolic resin layers of thicknesses smaller than 5 $\mu$m were likely to form pin holes which caused to degradation of the long term stability of the phenolic resin layers.

The phenolic resin paste comprises a mixture of 100 parts by weight of a phenolic resin, 16 parts by weight of a filler, and a solvent, the mixture being kneaded into a paste. The filler is composed of fine particles of an inorganic insulating material as of alumina or silica. The addition of the filler allows the phenolic resin paste to be printed easily and increases the heat resistance of the resistive body.

EXAMPLE I

Figure 2:
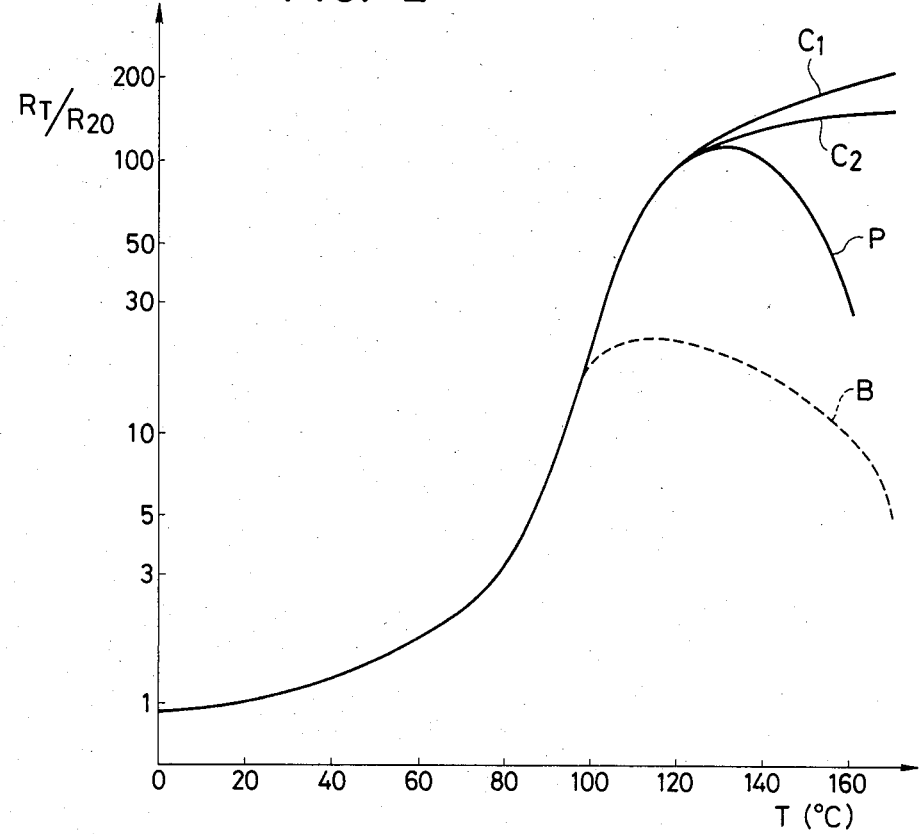
FIG. 2 is a diagram illustrating, for comparison, the temperature vs. resistance ratio characteristic curves of planar resistance heating elements according to the present invention and a planar resistance heating element composed of a conventional resistive body.

The resistive body according to a first example exhibited the measured temperature vs. resistance ratio characteristic curves C1, C2 shown in FIG. 2. The graph of FIG. 2 has a horizontal axis indicative of an ambient temperature T° C. and a vertical axis of a resistance ratio ($R_T/R_{20}$) of a resistance $R_T$ to a resistance $R_{20}$ at a temperature of 20° C. The curve C1 is representative of the average of five samples which were baked at 160° C. for 20 minutes, and the curve C2 is representative of the average of five samples which were baked at 150° C. for 1 hour. It can be seen that each has stable PTC characteristics up to a high-temperature range.

A curve P was plotted for a sample which was baked at 150° C. for 20 minutes, conditions which fail to achieve the effects of the present invention. The curve P shows that the resistance ratio $R_T/R_{20}$ is abruptly reduced at about 130° C. In addition, other samples in which the thickness of the phenolic resin layer 16 was varied in the range of from 5 to 20 $\mu$m under the conditions described above were also measured for temperature vs. resistance ratio characteristics. It was found that the thickness has no effect on the characteristics in the above thickness range.

EXAMPLE II

In the second example, the phenolic resin paste in the phenolic resin layer had a varied composition. The insulating substrate, the electrodes on the insulating substrate, and the resistive body layer deposited between the pair of electrodes were the same as those in the first example. The phenolic resin paste in the phenolic resin layer formed on the resistive body layer was a phenolic paste denatured by an elastomer resin. As an example of the elastomer resin, nitrile rubber family was found effective to improve flexibility and heat-durability of the denatured phenolic resin.

The denatured phenolic paste was composed of a mixture of 100 parts by weight of a denatured phenolic resin, 16 parts by weight of a filler comprising fine inorganic particles as of alumina or silica, and a solvent, the mixture being kneaded into a paste. Butyl carbinor was used as the solvent. Use of the denatured phenolic resin increases the resiliency and flexibility of the planar resistance heating element. Therefore, it is effective to use the denatured phenolic resin when producing a planar resistance heating element which will be attached to a curved surface of a member to be heated.

The measured temperature vs. resistance ratio characteristic curves of the second example are shown in FIG. 2, and remain the same as those of the first example regardless of the use of the denatured phenolic paste.

By adding the filler to the denatured phenolic resin in the second example, the phenolic resin paste can easily be printed, and the resistive body has an increased heat resistance.

Figure 3:
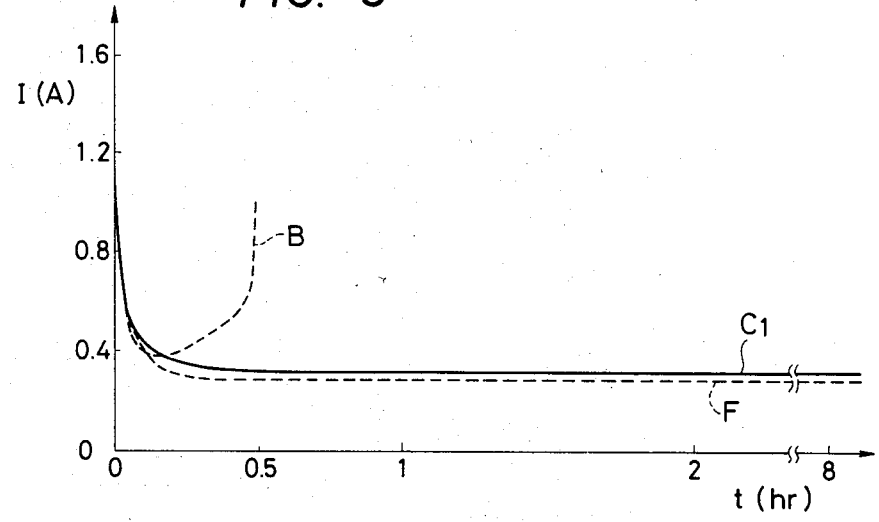
FIG. 3 is a diagram showing, for comparison, the time vs. current characteristic curves, obtained in an accelerated deterioration test, of planar resistance heating elements according to the present invention and a planar resistance heating element composed of a conventional resistive body with PTC.

FIG. 3 shows a characteristic curve C1 of a heating element according to the first example, produced under the same conditions as those for the curve C1 in FIG. 2, the curve C1 being plotted in an accelerated deterioration test in which a voltage 500 V five times higher than the rated voltage was applied between the electrodes of the heating element. The graph of FIG. 3 has a horizontal axis indicative of elapsed time and a vertical axis indicative of current. The curve C1 shows that the current becomes constant at about 0.32 A after the voltage has been applied for about 20 minutes, and the current will not rise, so that no undesirable burnout will occur. It was confirmed that no burnout took place after 8 hours and hence burnouts can be prevented completely.

As a result of an accelerated deterioration test conducted under the same conditions as those of the same test for the first example, a characteristic curve F in FIG. 3 was plotted which shows a stable current 0.28 A lower than that of the first example. Therefore, it was confirmed that the second example was better in deterioration characteristics than the first example. In the accelerated deterioration test, the conventional resistive body will be burned out completely after 30 minutes as indicated by the curve B in FIG. 3.

Figure 4:
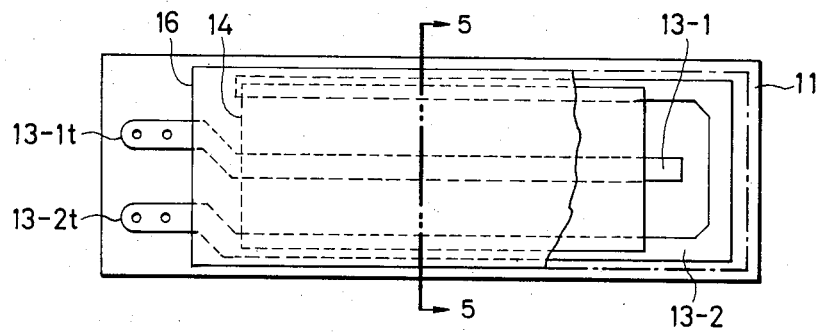
FIG. 4 is a plan view of a planar resistance heating element of the present invention, showing a shape thereof by way of example.

FIG. 4 shows a configuration of a planar resistance heating element according to the present invention, the planar resistance heating element being shown as seen from the side of a transparent covering layer 16 which is partially cut away to show the elements under said layer. Electrode patterns 13-1, 13-2 are first deposited by screen printing on the polyester substrate 11, and then baked. Thereafter, a resistive body layer 14 is formed by screen printing between the electrodes 13-1, 13-2 and then baked. Next, a covering layer 16 of a phenolic resin or a denatured phenolic resin, as described in the first or second example, is formed by screen printing and baked in covering relation to the entire surface of the electrode pattern and the resistive body pattern, leaving terminal portions 13-1$t$, 13-2$t$ of the electrodes 13-1, 13-2. The planar resistance heating element of FIG. 4 thus fabricated will be intimately fixed to a surface of an object to be heated.

Figure 5:
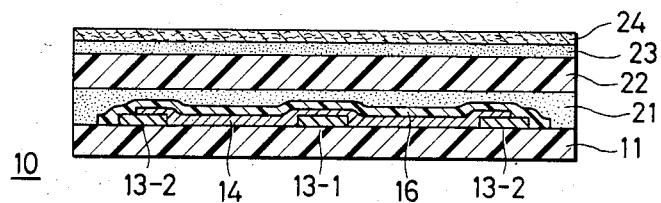
FIG. 5 is a cross-sectional view, a portion of which is taken on line 5—5 of FIG. 4, of a planar resistance heating element of the present invention, which has an insulating protective film and an attachment bonding layer thereon.

FIG. 5 shows in a cross section a planar resistance heating element constructed to allow the planar resistance heating element of FIG. 4 to be attached easily to a surface of an object to be heated, to protect the resistive body layer 14 and the covering layer 16 against abrasion and scratches, and also to increase electric insulation with respect to the object to be heated. The components denoted by 11, 13-1, 13-2, 14, 16 are shown in cross section taken along line 5—5 in FIG. 4. FIG. 5 also illustrates an insulating protective film 22 such as a polyester sheet bonded all over the substrate 11 by a first adhesive layer 21, and a second adhesive layer 23 on an outer surface of the insulating protective film 22. For facilitating handling, storage, and shipment of the heating element, a release paper sheet 24 is applied to an outer surface of the second adhesive layer 23. In use, the release paper sheet 24 is peeled off to expose the surface of the second adhesive layer 23, which is bonded to a surface of an object to be heated. Each of the first and second adhesive layers 21,23 may comprise a two-sided adhesive tape. Alternatively, the opposite surfaces of the insulating protective film 22 may be coated with adhesive layers to provide a two-sided adhesive sheet. The adhesive for the adhesive layers may comprise an acrylic-resin-based adhesive.

The arrangement in any of the above examples may be constructed as a small-size heating element which is simple, firm, and flexible in structure, and can easily be attached to objects to be heated which may be of various shapes. Since the planar resistance heating element according to the second example uses a phenolic resin and can be formed easily into a curved shape, the heating element can be used on a curved surface of an object to be heated.

Figure 6:
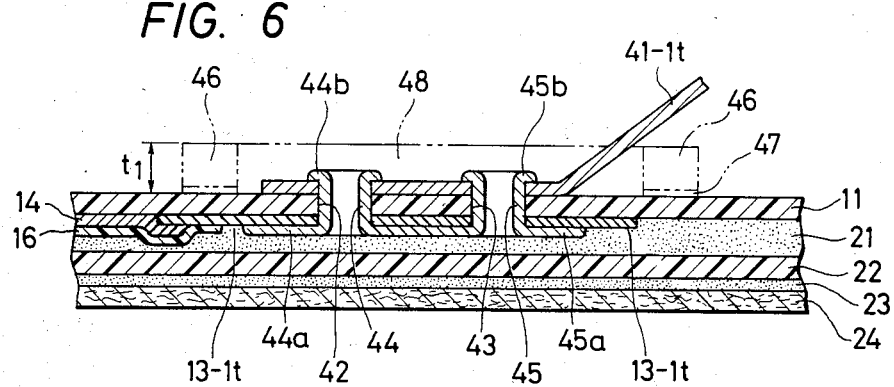
FIG. 6 is a cross-sectional view of a terminal connecting portion of the planar resistance heating element of the present invention.

FIG. 6 shows a cross-sectional view of an example of a terminal connecting portion, which is employed in the planar resistance heating element of the present invention. The parts corresponding to those in FIGS. 4 and 5 are identified by the same reference numerals. The attachment of terminal lugs 41-1$t$ is carried out after the formation of the phenolic resin layer 16 and before the provision of the adhesive layer 21. The terminal lug 41-1$t$ is disposed on the outer surface of the insulating substrate 11 in opposing relation to the electrode terminal portion 13-1$t$. Two through holes 42, 43 are made at the electrode terminal portion 13-1$t$ through the insulating substrate 11 and the terminal lug 41-1$t$ and tubular metal connectors 44 and 45 are inserted into the holes 42 and 43, respectively. The overlapping portions of the substrate 11 and the terminal lug 41-1$t$ are staked by both end portions of the tubular metal connectors 44 and 45. That is, the tubular metal connectors 44 and 45 have at one end outwardly extending flanges 44$a$ and 45$a$ formed integrally therewith, and the flanges 44$a$ and 45$a$ are urged against the electrode terminal portion 13-1$t$. The other end portions of the tubular metal connectors 44 and 45 are expanded outwardly to form flanges 44$b$ and 45$b$. Thus, the substrate 11 and the terminal lug 41-1$t$ are staked. The tubular metal connectors 44, 45 electrically connect the electrode terminal portion 13-1$t$ and the terminal lug 41-1$t$. In this example, the flanges 44$a$ and 45$a$ of the tubular metal connectors 44 and 45 are integrally formed by pressing a rectangular metal sheet.

In the case where the planar resistance heating element of the present invention is specifcally required to have excellent humidity-tightness (or to be water-proof) at the terminal connecting portion, protective mound means is formed on the terminal connecting portion as depicted by broken line in FIG. 6 more particularly a frame 46 is bonded to the insulating substrate 11 to surround the terminal connecting portion. The frame 46 is made of, for example, Neoprene rubber and is a square-shaped frame having a square cross-section and a thickness $t_1$ of 1 to 2 mm. The frame 46 is adhered by a gummy adhesive layer 47 to the substrate 11. The inside of the frame 46 is filled with an RTV silicone resin mound 48, in which the flanges 44b and 45b of the tubular metal connectors 44 and 45 are embedded.

The adhesive layer 47 needs only to provisionally fix the frame 46 so that it does not easily get out of position before solidifying of the silicone resin mound 48 injected inside the frame 46 during manufacturing. The silicone resin mound 48 is pliable even after being solidified and fulfills the requirements of adhesiveness, heat resistance and solvent resistance. The terminal lug 41-1t may be replaced by a lead wire one end of which is staked, as a connecring conductor piece, by the tubular metal connector 44 or 45 to the substrate 11.

Figure 7:
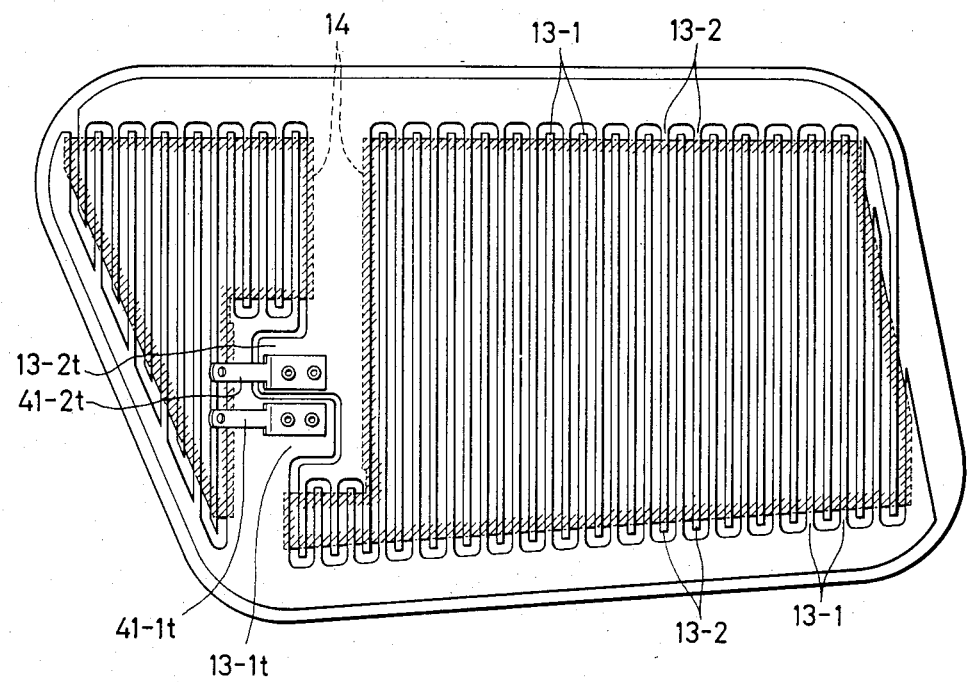
FIG. 7 is a view of an electrode pattern and a resistive body layer pattern, which are suitable for use in a defroster and mirror combination in which a heating element of the present invention is attached to a mirror.

FIG. 7 shows, by way of example, patterns of an electrode layer and a resistive body layer, which are suitable for use in a defroster and mirror combination in which a planar resistance heating element 10 of the invention is attached to the back of a mirror. Electrodes 13-1, 13-2 are shaped as interdigitating comb teeth distributed substantially fully over a substrate 11. A resistive body layer 14 is formed in regions, shown as hatched, where the comb teeth mesh with each other and between the comb teeth. Although not shown, a phenolic resin layer is formed substantially over the entire surface, leaving marginal edges and terminal attachment portions of the planar resistance heating element.

Figure 8:
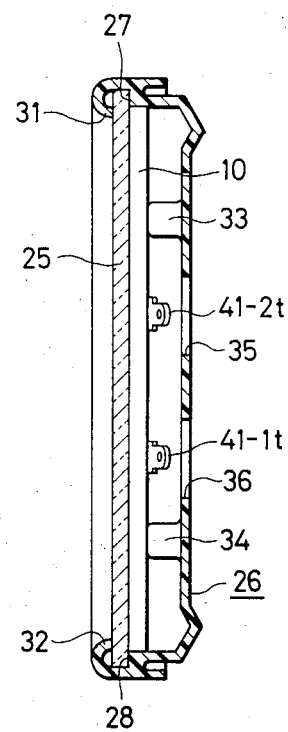
FIG. 8 is a cross-sectional view of a defroster and mirror combination in which a planar resistance heating element is bonded to a mirror and accommodated in a housing.

FIG. 8 illustrates in cross section a defroster and mirror unit in which a heating element 10 is attached to a mirror 25 and accommodated in a mirror housing 26. The housing 26 is formed as by molding a thermoplastic resin such as of polypropylene or ABS resin and comprises a container of a rectangular configuration which is slightly greater than or substantially equal to the outer profile of the heating element 10 shown in FIG. 7. The housing 26 has at least a pair of confronting side walls having steps 27, 28 disposed in intermediate positions in the direction of the depth of the housing 26. The mirror 25 with the heating element 10 of FIG. 7 bonded thereto is disposed in the housing 26 in contact with the steps 27, 28. The side walls of the housing 26 have ends 31, 32 in the opening of the housing 26, the ends 31, 32 being heated and bent inwardly into pressing engagement with the mirror 25. The housing 26 includes a bottom having integral supports 33, 34 projecting therefrom and engaging the heating element 10 to keep the latter spaced from the bottom. The bottom of the housing 26 has holes 35, 36 for passage of air and lead wires extending from terminal lugs 41-1t, 41-2t. The above arrangement allows the mirror 25 to be heated uniformly over the entire surface. Because of the self temperature control capability of the heating element 10, the mirror can be maintained at a certain temperature without employing a thermostat. As the heating element of the invention has PTC characteristics at high temperature, there is no danger of an excessive current flowing through the heating element and hence the heating element is prevented from burnout.

As described above, the resistive body of the invention has its PTC characteristics maintained even when the temperature at which it is used exceeds the melting point of the crystalline resin. Therefore, the resistive body is prevented from burnout when an excessive voltage is applied thereto and has an increased self temperature control ability.

Although in the above examples the insulating substrate 11 was made of polyester, it may be formed of epoxy resin, polypropylene, polyimide, or phenolic resin. The resistive body layer and the phenolic resin layer may be formed by spraying or dipping, rather than by screen printing. While a pair of electrodes have been described, the present invention is generally applicable to resistive bodies having a plurality of pairs of electrodes.

Accordingly, there is provided according to the present invention a planar resistance heating element which is simple and firm in construction, small in overall size, can maintain PTC characteristics when used at temperatures higher than the melting point of the crystalline resin, has excellent temperature control characteristics in which the resistance ratio changes to a large extent, and is capable of preventing burnout.

Although certain preferred embodiments have been shown and described, it should be understood that many changes and modifications may be made therein without departing from the scope of the appended claims.

What is claimed is:

1. A planar resistance heating element comprising:
   (a) an insulating substrate;
   (b) at least two electrodes disposed on a surface of said insulating substrate in spaced substantially parallel relation to each other;
   (c) a resistive body layer disposed between said electrodes and having a positive temperature coefficient, said resistive body layer being composed of a crystalline resin with electrically conductive particles dispersed therein;
   (d) a phenolic resin layer covering an entire surface of said resistive body layer;
   (e) an adhesive layer disposed on said phenolic resin layer and extending to a peripheral edge of said insulating substrate; and
   (f) an insulating protective film disposed on said adhesive layer in covering relation to an entire surface thereof.

2. A planar resistance heating element according to claim 1, wherein said insulating substrate comprises a polyester sheet.

3. A planar resistance heating element according to claim 1, wherein said phenolic resin layer is formed of a denatured phenolic resin containing an elastomer resin.

4. A planar resistance heating element according to claim 1, further including relation to a second adhesive layer disposed on said insulating protective film in covering an entire surface thereof.

5. A planar resistance heating element according to claim 4, including a release paper sheet bonded to said second adhesive layer over an entire surface thereof.

6. A planar resistance heating element according to claim 4, wherein each of said adhesive layers comprises a two-sided adhesive tape.

7. A planar resistance heating element according to claim 4, wherein each of said insulating substrate and said insulating protective film is formed of polyester.

8. A planar resistance heating element according to claim 4, wherein said phenolic resin layer includes a filler in the form of fine particles of an inorganic insulating material.

9. A planar resistance heating element according to one of claims 1 through 7, wherein said crystalline resin comprises a copolymer of polyethylene and vinyl acetate.

10. A planar resistance heating element according to claim 1 or 4, wherein said insulating substrate is formed of flexible resin and said planar resistance heating element is bonded at the side of said phenolic resin layer thereof to a back of a mirror of the same outer profile as that of said heating element to cover substantially entire area of the back of said mirror, to thereby constitute a defroster and mirror combination.

11. A planar resistance heating element according to claim 10, including an insulating protective film with adhesive layers on opposite surfaces thereof, said mirror and said planar resistance heating element being bonded to each other by said last-mentioned insulating protective layer.

12. A planar resistance heating element according to claim 10, wherein said electrodes comprise electrodes in the form of interdigitating comb teeth disposed substantially fully over said insulating substrate.

13. A planar resistance heating element according to one of claims 1 to 7, wherein each of said two electrodes comprises an electrode terminal portion, and a terminal lug mounted on the outer surface of said insulating substrate in opposing relation to said electrode terminal portion via said insulating substrate, said electrode terminal portion being electrically connected to said terminal lug by metal connecting means extending through a hole formed in said insulating substrate at said electrode terminal portion.

14. A planar resistance heating element according to claim 13, wherein the connecting portion of said terminal lug is embedded in a silicone resin mound formed inside a frame attached to the outer surface of said insulating substrate to surround the connecting portion of said terminal lug.

* * * * *